US010930078B1

United States Patent
Côté et al.

(10) Patent No.: US 10,930,078 B1
(45) Date of Patent: Feb. 23, 2021

(54) TECHNIQUES FOR IMPROVING PERCEPTION OF PROJECTIONS OF SUBSURFACE FEATURES ON A TERRAIN SURFACE IN AUGMENTED REALITY

(71) Applicant: Bentley Systems, Incorporated, Exton, PA (US)

(72) Inventors: Stéphane Côté, Lac Beauport (CA); Jade Marcoux-Ouellet, Quebec (CA)

(73) Assignee: Bentley Systems, Incorporated, Exton, PA (US)

(*) Notice: Subject to any disclaimer, the term of this patent is extended or adjusted under 35 U.S.C. 154(b) by 40 days.

(21) Appl. No.: 16/178,360

(22) Filed: Nov. 1, 2018

Related U.S. Application Data

(63) Continuation of application No. 62/580,369, filed on Nov. 1, 2017.

(51) Int. Cl.
*G06T 19/20* (2011.01)
*G06T 19/00* (2011.01)

(52) U.S. Cl.
CPC .......... *G06T 19/006* (2013.01); *G06T 19/20* (2013.01); *G06T 2219/2004* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 6,094,625 A * | 7/2000 | Ralston | G06T 19/006 239/161 |
| 9,715,008 B1 | 7/2017 | Côté | |
| 9,824,492 B2 | 11/2017 | Peterson et al. | |
| 2004/0204859 A1* | 10/2004 | Knobloch | G01V 1/34 702/16 |
| 2014/0002472 A1 | 1/2014 | Sobeski et al. | |
| 2014/0200863 A1* | 7/2014 | Kamat | G01C 15/00 703/1 |

(Continued)

OTHER PUBLICATIONS

Lerotic, Mirna, et al. "pq-space Based Non-Photorealistic Rendering for Augmented Reality," International Conference on Medical Image Computing and Computer-Assisted Intervention, Springer Berlin Heidelberg, Feb. 2007, pp. 1-8.

(Continued)

*Primary Examiner* — James A Thompson
(74) *Attorney, Agent, or Firm* — Cesari and McKenna, LLP; James A. Blanchette

(57) ABSTRACT

In one embodiment, techniques are provided for improving perception of representations of subsurface features (e.g., virtual paint markings) in augmented reality. An input image of a terrain surface is accessed. An augmentation stencil image aligned with the input image is created and represented utilizing HSL color space. The input image is converted to the HSL color space. The technique creates and displays an augmented image that, for each pixel that falls outside of the representation subsurface features, has pixel values based on a hue value, a saturation value and a lightness value of the input image and for each pixel that coincides with the representation subsurface features has pixel values based on a hue value and a saturation value of the augmentation stencil image and a lightness value based on the input image.

19 Claims, 9 Drawing Sheets

(56) References Cited

U.S. PATENT DOCUMENTS

| | | | | |
|---|---|---|---|---|
| 2016/0196665 | A1* | 7/2016 | Abreu | G06T 7/251 |
| | | | | 345/427 |
| 2016/0370971 | A1* | 12/2016 | Hackett | G06T 11/001 |
| 2017/0053442 | A1* | 2/2017 | Sumner | G06K 9/00208 |
| 2019/0122404 | A1* | 4/2019 | Freeman | G06T 7/251 |

OTHER PUBLICATIONS

Su, Xing, et al., "Uncertainty-aware Visualization and Proximity Monitoring in Urban Excavation: A Geospatial Augmented Reality Approach," Springer, Visualization in Engineering 1.2 a SpringerOpen Journal, Jun. 12, 2013, pp. 1-13.

Talmaki. Sanat A., "Real-Time Visualization for Prevention of Excavation Related Utility Strikes," Dissertation, The University of Michigan, Jan. 2012, pp. 1-366.

U.S. Appl. No. 15/091,796, filed Apr. 6, 2016 by Stéphane Côté, et al. for Tool for Accurate Onsite Model Visualization That Facilitates Environment Interaction, pp. 1-29.

U.S. Appl. No. 15/709,115, filed Sep. 19, 2017 by Stéphane Côté, et al. for Tool for Onsite Augmentation of Reality Meshes, pp. 1-27.

Zollmann, Stefanie, et al., "Image-based Ghostings for Single Layer Occlusions in Augmented Reality," IEEE, Mixed and Augmented Reality (ISMAR) 2010, 9th IEEE International Symposium on IEEE, Nov. 2010, pp. 1-8.

* cited by examiner

TECHNIQUES FOR IMPROVING PERCEPTION OF PROJECTIONS OF SUBSURFACE FEATURES ON A TERRAIN SURFACE IN AUGMENTED REALITY

RELATED APPLICATION

The present application claims the benefit of U.S. Provisional Patent Application No. 62/580,369 titled "TECHNIQUES FOR IMPROVING PERCEPTION OF SUBSURFACE FEATURES ON A TERRAIN SURFACE IN AUGMENTED REALITY", filed on Nov. 1, 2017, the contents of which are incorporated herein by reference.

BACKGROUND

Technical Field

The present disclosure relates to augmented reality, and more specifically to techniques for improving perception of representations (e.g., virtual paint markings) of subsurface features (e.g., utility pipes) projected on a terrain surface.

Background Information

Excavation work (e.g., road excavation work) often creates traffic disruptions that inconvenience local residents and harm the local economy. Further, there is potential of injury should mistakes occur. Accordingly, it is important to carefully plan such work, so that it can be conducted efficiently and safely. Traditionally, excavation work is planned in the field using paper plans and subsurface utility detection equipment (e.g., ground-penetrating radar). Based on this information, workers manually mark the terrain surface (e.g., a paved surface such as a road or parking lot, a grass surface, a combination of multiple types of surfaces, etc.) with physical markings (e.g., colored spray paint). These physical markings serve as guides for the excavation.

Augmented reality is a useful tool to facilitate planning of excavations. It has the potential to decrease planning time requirements, while also minimizing mistakes and increasing safety. In a typical augmented reality application for excavation planning, virtual paint markings may be used to indicate subsurface features (e.g., utility pipes), allowing a user to visualize the subsurface features without the need for any physical markings on the terrain surface (e.g., without spray painting)

To be useful, such augmentations need to be highly accurate. Indicating a wrong location may cause delays (e.g., one may excavate in the wrong place only to later have to excavate in the right place), or accidents (e.g., hitting gas pipes or other dangerous utilities). Further, "jitter" of the augmentation is highly undesirable. "Jitter" is a visual artefact where the augmentation moves about unpredictably as a side effect of user movement or changing environmental conditions.

A variety of efforts are being made to address the accuracy requirements in augmented reality engineering applications and to avoid issues such as "jitter." However, even if these challenges can be fully overcome, further challenges are faced involving user perception of the augmentation itself. Even if an augmentation is highly accurate and stable, a user may not have confidence in the augmentation if they do not perceive it to be highly accurate. User perception may be dependent on how well the augmentation is integrated into a physical environment's virtual representation (i.e. how natural it appears). If virtual paint markings do not have characteristics similar to physical markings (e.g., actual spray paint), but instead appear to "float above" the terrain surface or occlude the terrain surface completely, a user may perceive them to be inaccurate, and be reluctant to rely upon them, regardless of how accurate they truly are. This user perception challenge may hinder the widespread adoption of augmented reality for planning excavations, even if the accuracy and stability challenges can be fully addressed.

It should be understood that these issues are not limited to excavation planning. In general, users may be reluctant to rely upon any sort representations upon any type of surface that do not appear natural. Whether the surface is the ground, a wall, a ceiling, etc. similar user perception issues are confronted, and a user may not rely on augmentations they perceive to be inaccurate, regardless of how accurate they truly are.

Accordingly, there is a need for new techniques for improving perception of representations (e.g., virtual paint markings) of subsurface features (e.g., utility pipes) projected on a terrain surface in augmented reality, so as to increase user confidence in the information being conveyed. Further, it would be desirable if such techniques could be extended to other types of surfaces (e.g., walls, ceilings, etc.) and other types of hidden features to address similar perception challenges.

SUMMARY

Augmentation techniques are provided that improve perception of representations (e.g., virtual paint markings) of subsurface features (e.g., utility pipes) projected on a terrain surface (e.g., a paved surface, a grass surface, a combination of multiple types of surfaces, etc.) by leveraging channels of a color space to replace colors of an input image with those from augmentations, but preserves textures of the input image. Such techniques may better enable augmentations to appear integrated into the terrain surface, rather than to appear to "float above" the terrain surface or to occlude the terrain surface completely. The techniques may be used in devices that provide live augmentation, with the input image being a current image of a live video stream captured by a camera of an augmented reality device, or in devices that provide augmentation of pre-captured or rendered views of reality, with the input image being a stored image or a detailed three-dimensional (3D) rendering of an existing environment (e.g., a rendering of a 3D reality mesh). Further, the techniques may be extended to other types of surfaces (e.g., walls, ceilings, etc.) and other types of hidden features to address similar perception challenges.

In one specific embodiment, an input image of a terrain surface is accessed. An augmentation stencil image aligned with the input image is created, based on an orthogonal projection of a model of subsurface features onto a model of the terrain surface. The augmentation stencil image includes pixels set to one or more virtual paint colors that serve as a representation of projected subsurface features, the pixels each having pixel values in a hue saturation lightness (HSL) color space. The input image is converted so that its pixels also have pixel values in the HSL color space. An augmented image is created that, for each pixel that falls outside of the representation of projected subsurface features, has pixel values based on a hue value, a saturation value and a lightness value of the input image, and, for each pixel that coincides with the representation of projected subsurface features, has pixel values based on a hue value and a saturation value of the augmentation stencil image (to provide color) and a lightness value based on the input image (to preserve texture). The augmented image is then displayed on a display device to a user.

In another specific embodiment, an image of a surface (e.g., wall, ceiling, etc.) in a physical environment is accessed. An augmentation stencil image aligned with the input image is created. The augmentation stencil image includes pixels set to one or more virtual paint colors that serve as a representation of hidden features. An augmented image is created that, for each pixel that falls outside of the representation of hidden features, has pixel values based on the input image, and, for each pixel that coincides with the representation of hidden features, has at least one pixel value based on the augmentation stencil image (to provide color) and at least one pixel value based the input image (to preserves texture). The augmented image is then displayed on a display device to a user.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 1:
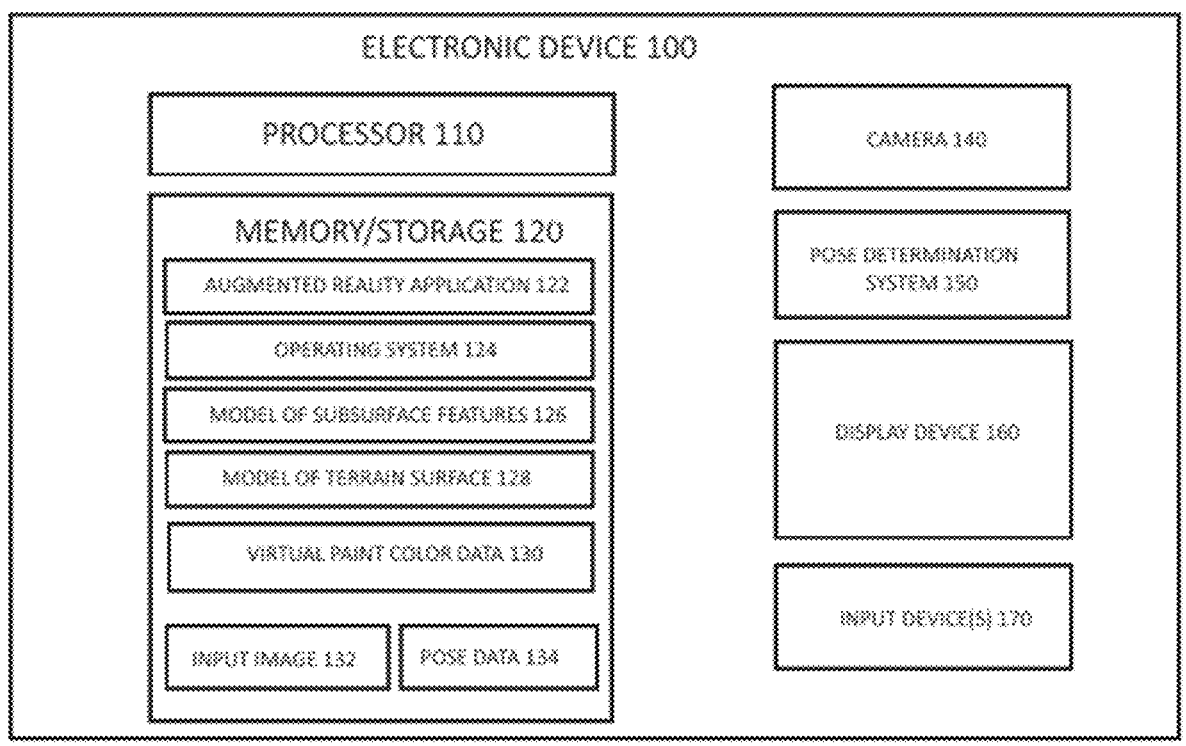
FIG. 1 is a block diagram of an example electronic device that may be used with the techniques described herein to improve perception of representations (e.g., virtual paint markings) of subsurface features (e.g., utility pipes) on a terrain surface.

FIG. 1 is a block diagram of an example electronic device 100 that may be used with the techniques described herein to improve perception of representations (e.g., virtual paint markings) of subsurface features (e.g., utility pipes) on a terrain surface. The electronic device 100 may be an augmented reality device, such as a head-mounted display unit (e.g., the Microsoft HoloLens® head-mounted display unit), a tablet computer, or another type of mobile device that may be transported in the physical environment and used with live augmentation. Alternatively, the electronic device may be a computing device, such as a desktop computer, mobile computer, or another type of device that may be used to view or otherwise interact with augmentations of stored images or detailed 3D renderings of existing environments. The 3D renderings of existing environments may be renderings of a 3D reality mesh. As used herein the term "3D reality mesh" refers to a textured 3D polygon mesh based on data captured from the real world. A 3D reality mesh may be created by structure-from-motion (SFM) photogrammetry and/or other techniques.

The electronic device 100 includes a processor 110 coupled to volatile and nonvolatile memory/storage devices 120 that, among other things, store processor-executable instructions and data. The instructions include at least instructions of an augmented reality application 122 and an operating system 124. The data includes at least a model of the subsurface features (e.g., a 2D or 3D utility pipe model) 126, a model of the terrain surface 128 (e.g., a 3D surface mesh), virtual paint color data (e.g., a file) 130 indicating virtual paint colors assigned to represent subsurface features, an image of the terrain surface in a physical environment 132 (referred to hereinafter as the "input image"), and current pose data 134. The model of the subsurface features 126, the model of the terrain surface 128, and the virtual paint color data 134 may be persistent entities that are pre-loaded locally in the memory 120 or, in other implementations, obtained via a network connection to a remote server (not shown). The input image 132 and the pose data 134 may be transitory entities, continually being recaptured/updated.

For example, in an embodiment involving live augmentation, the input image 132 may be a current image of a stream of images of the physical environment captured by a camera 140 (e.g., a video camera). The pose data 134 may be a current pose in the physical environment of the camera 140 that captured the input image. Alternatively, in an embodiment involving stored images or 3D renderings (e.g., renderings of a 3D reality mesh), the input image 132 may be an image from a collection of stored images, a 3D rendering, or a combination of multiple stored images 3D renderings. The pose data 134 may be a pose in the physical environment from which the stored image was previously captured, or a pose in a virtual environment from which a 3D rendering is viewed (e.g., from which a 3D reality mesh was viewed).

The pose may be determined by a pose determination system 150 that can take different forms depending on the embodiment. In an embodiment involving live augmentation, the pose determination system 150 may include a number of individual position and orientation sensors and interfaces, such as a Wi-Fi interface, a global positioning system (GPS) receiver, beacon-based positioning sensors (e.g., Bluetooth), orientation sensors, magnetometers, and the like. In some implementations, the camera 140 may be part of the pose determination system 150 and visual features from a stream of images therefrom may be matched against features the model of the terrain surface 128 or against features extracted from previously-captured images (e.g., using simultaneous localization and mapping (SLAM) techniques) to assist in determining pose. In other implementations, an independent tracking system separate from the augmented reality device 100 (not shown) may also be used to assist in determining pose. In an embodiment involving stored images or a view of a 3D rendering (e.g., a view a 3D reality mesh), the pose determination system 150 may take the form of a software routine that processes information stored in conjunction with the input image 132, or derived from the input image itself, rather than include actual sensors. In still other embodiments, the pose determination system 150 may take the form of a user interface that solicits a user-provided pose.

In addition, the electronic device 100 further includes a display device 160 (e.g., a stereoscopic optical see-through head-mounted display, a touch screen panel, a non-touch enabled liquid crystal display (LCD), etc.) configured to show an augmented reality image generated using the techniques described herein. At least one input device 170 (e.g., a touch sensor, a sensor detecting hand gestures, a voice command interface, a keyboard, a mouse, etc.) is provided to receive user selections for interacting with the electronic device 100, and the augmented reality view displayed thereby.

It should be understood that the electronic device 100 may include a wide variety of other hardware and software components, and that the above described components are merely illustrative. Further, while it is discussed above that the electronic device 100 may take the form of an augmented reality device or other computing device, it should be understood that the electronic device 100 can also comprise multiple separate devices operating together. In general, a variety of distributed, collaborative, and/or remote computing arrangements are possible.

Figure 2:
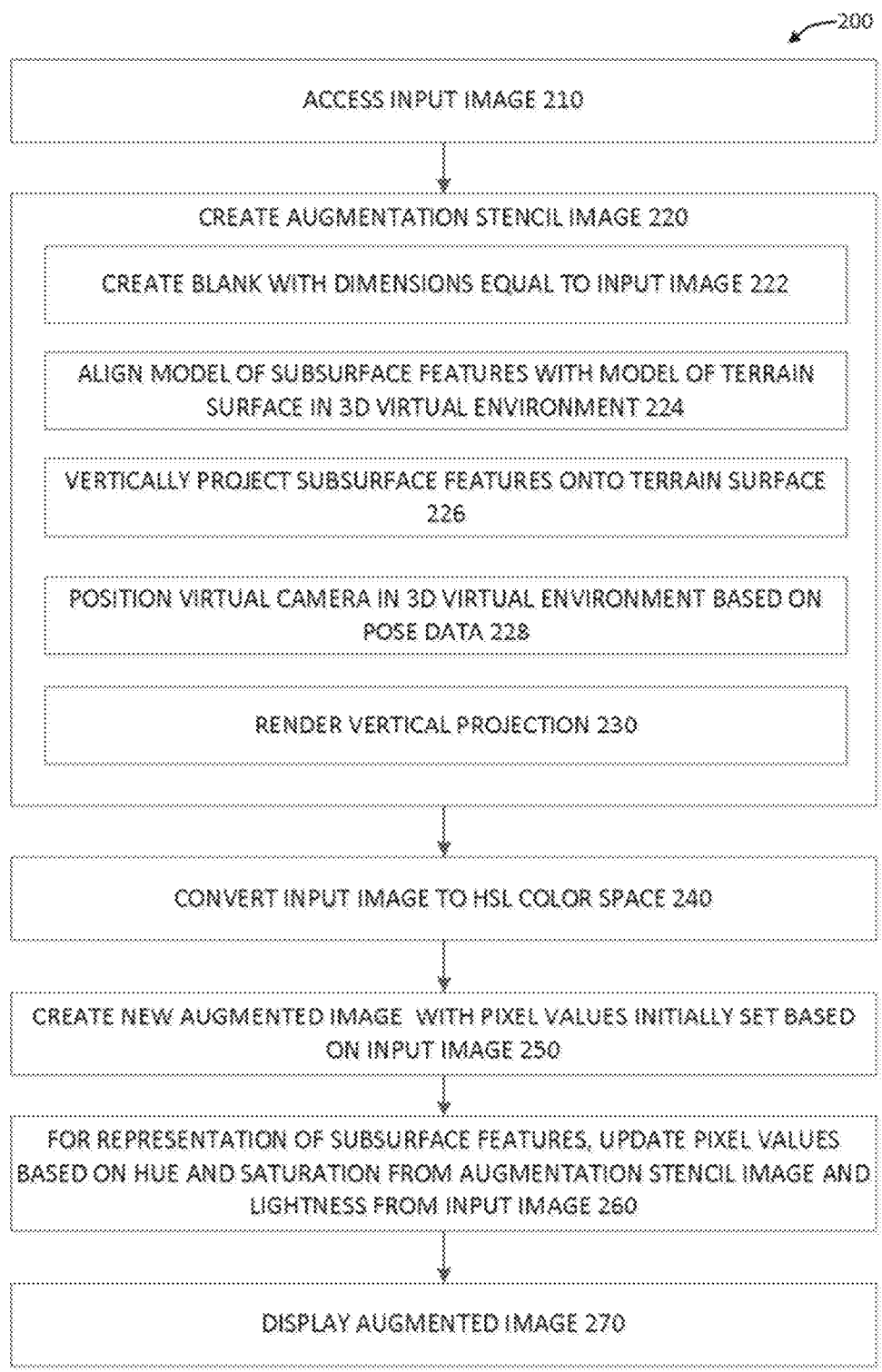
FIG. 2 is flow diagram of an example sequence of steps that may be executed by the electronic device to improve perception of representations of subsurface features on a terrain surface.
Figure 3:
FIG. 3 is an example input image that is referred to for purposes of illustration.

FIG. 2 is flow diagram of an example sequence of steps that may be executed by the electronic device 100 to improve perception of representations of subsurface features on a terrain surface. At step 210, the augmented reality application 122 accesses an input image of the terrain surface (e.g., from a stream of images from the camera 140, from a collection of stored images, from a view of a rendering of a 3D reality mesh, etc.). FIG. 3 is an example input image 132 that is referred to for purposes of illustration. In this example, the input image 132 includes a paved surface with at least some existing physical markings (e.g., actual paint). Such existing physical markings have often presented challenges in augmentation. While the input image 132 is shown here in greyscale for patent reproduction purposes, it should be understood that the input image 132 typically will include colors, and the physical markings may be in a variety of different colors.

At step 220, the augmented reality application 122 creates an augmentation stencil image that is aligned with the input image. The augmentation stencil image is an image that includes pixels having pixel values set to virtual paint colors to represent locations of subsurface features. To create the augmentation stencil image, at sub step 222, the augmented reality application 122 first creates a blank augmentation stencil image whose dimensions equal the dimensions of the input image. At sub step 224, the augmented reality application 122 aligns the model of the subsurface features 126 (e.g., a 2D or 3D utility pipe model) with the model of the terrain surface 128 (e.g., the 3D surface mesh) in a 3D virtual environment. At sub step 226, the augmented reality application 122 orthogonally projects the model of the subsurface features 126 onto the model of the terrain surface 128. Such projection may be directly conducted, or in some implementations, may require a number of preprocessing steps. For example, a map may first be created by extracting primitives (e.g., 2D primitives, such as lines or polylines) and converting the primitives to polygons that share the same normal. The polygons may be assigned colors from mappings of particular colors to particular types of subsurface features maintained in the virtual paint color data 130. At sub step 228, the augmented reality application 122 positions a virtual camera in the 3D virtual environment to have a pose in the 3D virtual environment that corresponds to the pose data 134. As discussed above, the pose data 134 may represent the current pose in the physical environment of the camera 140, pose in the physical environment from which a stored image was previously captured, pose in a virtual environment from which the 3D rendering (e.g., rendering of a 3D reality mesh) is being viewed, etc., depending on the implementation. Then, at sub step 230, the augmented reality application 122 renders the orthogonal projection of the model of the subsurface features 126 on the model of the terrain surface 128 as viewed from the pose of the virtual camera in the 3D virtual environment, and stores this rendering as the augmentation stencil image.

Figure 4:
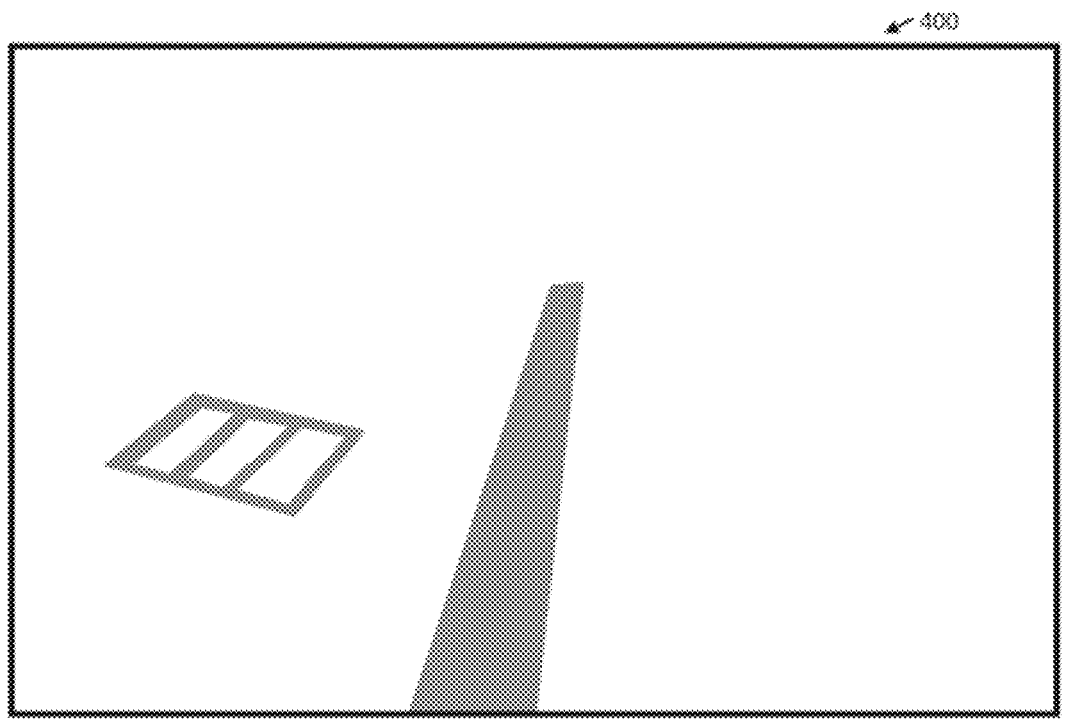
FIG. 4 is an example augmentation stencil image corresponding to the example input image of FIG. 3.

FIG. 4 is an example augmentation stencil image 400 corresponding to the example input image 132 of FIG. 3. The augmentation stencil image 400 includes two representations (e.g., two virtual paint markings) of subsurface features with pixels having pixel values of virtual paint colors.

According to one embodiment, the pixel values in the augmentation stencil image are represented in an HSL color space which defines color in terms of hue, saturation and lightness. The HSL color space may be envisioned using a geometric analogy. For example, the HSL color space may be envisioned as a cylindrical geometry with hue defined by radial angle around a central vertical axis, saturation defined by distance from the central vertical axis, and lightness defined by position along the central vertical axis. It should be understood that other geometric shapes may alternatively be used as part of this geometric comparison.

The HSL color space may be suited for replacing colors of the input image 132 with those from the augmentation stencil image, but preserving textures of the input image to provide a natural looking display. It should be understood, however, that other color spaces may be utilized, including other color spaces that use a cylindrical geometry, such as the hue saturation value (HSV) color space, and those that do not use a cylindrical geometry.

Figure 5:
FIG. 5 is a series of images showing hue, saturation and lightness channels, respectively, for the example input image of FIG. 3.
Figure 5:
Figure 5:

At step 240, the augmented reality application 122 converts the input image 132 from the original color space (e.g., the RGB color space) to the color space of the augmentation stencil image. Such conversions may be a direct conversion, or may include one or more conversions to intermediate color spaces, for example, depending upon the color space of the input image and the color space of the augmentation stencil image. In one embodiment, the conversion may be to the HSL color space, so that pixels of the input image each have respective hue, saturation and lightness components which collectively form hue, saturation and lightness channels. FIG. 5 is a series of images 510-530 showing hue, saturation and lightness channels, respectively, for the example input image 132 of FIG. 3. Image 530 shows the lightness. As can be seen, the texture of the terrain surface (including both the portion showing the paved surface and the portion showing non-paved surfaces (e.g., grass)) is clearly visible in the image 530. While the HSL color space produces this effect, it should be understood that a similar effect may be achieved in channels of certain other color spaces, for example, in the value channel of the HSV color space.

In steps 250-260, an augmented image is generated by combining pixel values from the input image and the augmentation stencil image. The combining may replace colors of the input image 132 with those from the augmentation stencil image for virtual paint markings, but preserve textures of the input image in the virtual paint markings, thereby yielding a more natural representation. Specifically, at step 250, the augmented reality application 122 creates a new image for storing results, referred to herein as the augmented image. Initially, pixel values of pixels of the augmented image are set based on (e.g., equal to) the pixel values of the input image 132. In an embodiment that uses the HSL color space, pixel values are initially all set based on (e.g., equal to) the hue value, saturation value and lightness value of the corresponding pixel in the input image 132. Likewise, in an alternative embodiment that uses a different color space, such as the HSV color space, pixel values may be set based on values of components in the different color space of the corresponding pixel in the input image. Then, at step 260, for each pixel that coincides with a representation (e.g., virtual paint markings) of subsurface features (e.g., utility pipes), the augmented reality application 122 updates the pixel values to insert new color, but preserve texture. Pixel values of pixels that fall outside of a representation of subsurface features are left unchanged.

In an embodiment that uses the HSL color space, pixel values of pixels of the augmented image that coincide with a representation (e.g., virtual paint markings) of subsurface features (e.g., utility pipes) are set based on (e.g., equal to) a hue value and a saturation value from the augmentation stencil image that provide the virtual paint colors, and based on (e.g., equal to or according to one or more mathematical relations) a lightness value from the input image 132 that provides texture. Likewise, in an alternative embodiment that uses a different color space, such as the HSV color space, pixel values of pixels of the augmented image that coincides with a representation (e.g., virtual paint markings) of projected subsurface features (e.g., utility pipes) may be set based on (e.g., equal to or according to one or more mathematical relations) a different combination of pixel values from the augmentation stencil image that provide virtual paint colors and from the input image 132 that provides texture.

Steps 250-260 may be represented using the following relations. In a first implementation of an embodiment that uses the HSL color space (referred to as the "base technique"), an augmented image ($H_A$, $S_A$, $L_A$) may be defined as:

$$H_A = H_P$$

$$S_A = S_P$$

$$L_A = L_R$$

where $H_A$ is the hue channel of the augmented image, $S_A$ is the saturation channel of the augmented image, $L_A$ is the lightness channel of the augmented image, $H_P$ is the hue channel of the augmentation stencil image that provides hue of the virtual paint, $S_P$ is the saturation channel of the augmentation stencil image that provides saturation of the virtual paint, and $L_R$ is the luminance channel of the initial image that provides texture of the terrain surface.

Figure 6:
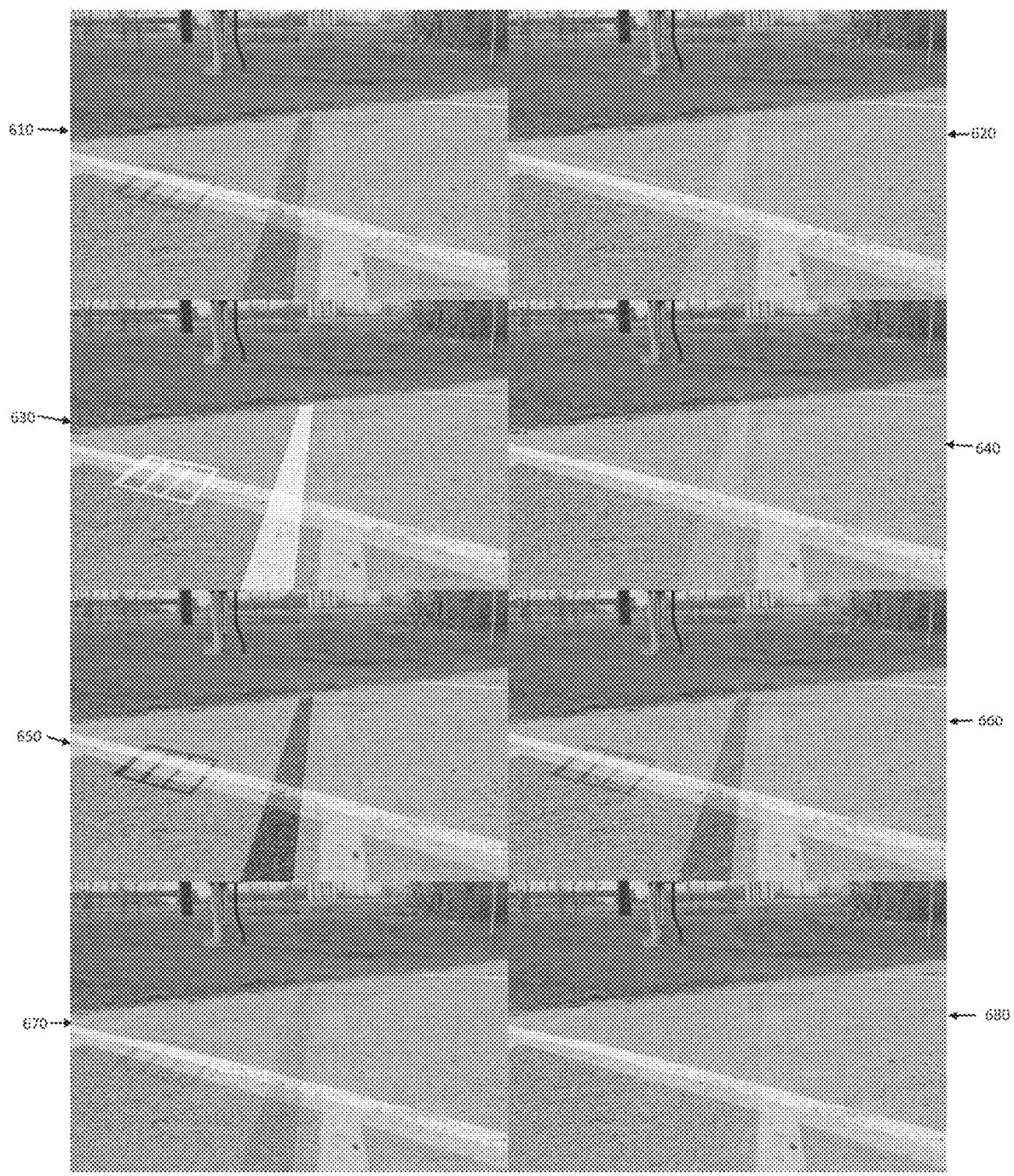
FIG. 6 is a series of augmented images showing representations (e.g., virtual paint markings) of subsurface features (e.g., utility pipes) according to a "base technique"

FIG. 6 is a series of augmented images 610-680 showing representations (e.g., virtual paint markings) of subsurface features (e.g., utility pipes) according to the "base technique". While FIG. 6 has been converted to greyscale for patent reproduction purposes, it should be understood that each image 610-680 is intended to include representations in a different color (red, orange, yellow, green, blue, purple, pink and white, respectively). The result is an improvement for most colors over other color spaces (or not using any special techniques whatsoever). However, it is observed that certain issues may occur with the color white. Specifically, the representations (e.g., virtual paint markings) of subsurface features (e.g., utility pipes) may not completely cover the physical markings in the case of white.

This issue may be addressed in a second implementation of an embodiment that uses the HSL color space (referred to as the "advanced technique"), that specially handles the color white, both in terms of white representations (e.g., white virtual paint markings) and coverage of representations (e.g., virtual paint markings) over existing white physical markings. The special handling may involve rendering parameters, such as a white threshold, a black threshold and a lightness threshold. In such technique, the augmented image ($H_A$, $S_A$, $L_A$) may be defined as:

$$H_A = H_P$$

$$S_A = S_P$$

For Colors: $L_A = (T_{white} - T_{black}) \times L_R + T_{black}$

Figure 7:
FIG. 7 is a series of augmented images showing representations (e.g., virtual paint markings) of subsurface features (e.g., utility pipes) with decreasing white thresholds (from left to right) and increasing black thresholds (from top to bottom) according to an "advanced technique"

For White:

$$L_A = \begin{cases} 255 & \text{if } L_R > T \\ \dfrac{L_R * 254}{T} & \text{otherwise} \end{cases}$$

where $H_A$ is the hue channel of the augmented image, $S_A$ is the saturation channel of the augmented image, $L_A$ is the lightness channel of the augmented image, $H_P$ is the hue channel of the augmentation stencil image that provides hue of the virtual paint, $S_P$ is the saturation channel of the augmentation stencil image that provides saturation of the virtual paint, and $L_R$ is the luminance channel of the initial image that provides texture of the terrain surface, $T_{white}$ is a white threshold, $T_{black}$ is a black threshold, and $T$ is a lightness threshold. The white threshold $T_{white}$ and black threshold $T_{black}$ may be tuned to improve visual appearance of the representations (e.g., virtual paint markings) of subsurface features (e.g., utility pipes). For example, the lower the white threshold, the less "white" existing white physical markings will appear when collocated with representations (e.g., virtual paint markings) of subsurface features, allowing for better coverage of such existing markings. Likewise, the higher the black threshold, the less dark, but more viscous, the representations (e.g., virtual paint markings) of subsurface features will appear. FIG. 7 is a series of augmented images 700 showing representations (e.g., virtual paint markings) of subsurface features (e.g., utility pipes) with decreasing white thresholds (from left to right) and increasing black thresholds (from top to bottom) according to the "advanced technique." By adjusting these parameters improved coverage of representations (e.g., virtual paint markings) over existing white physical markings may be achieved for various circumstances. While the augmented images 700 are shown here in greyscale for patent reproduction purposes, it should be understood that the virtual paint in such images is intended to be in color, for example, orange.

Figure 8:
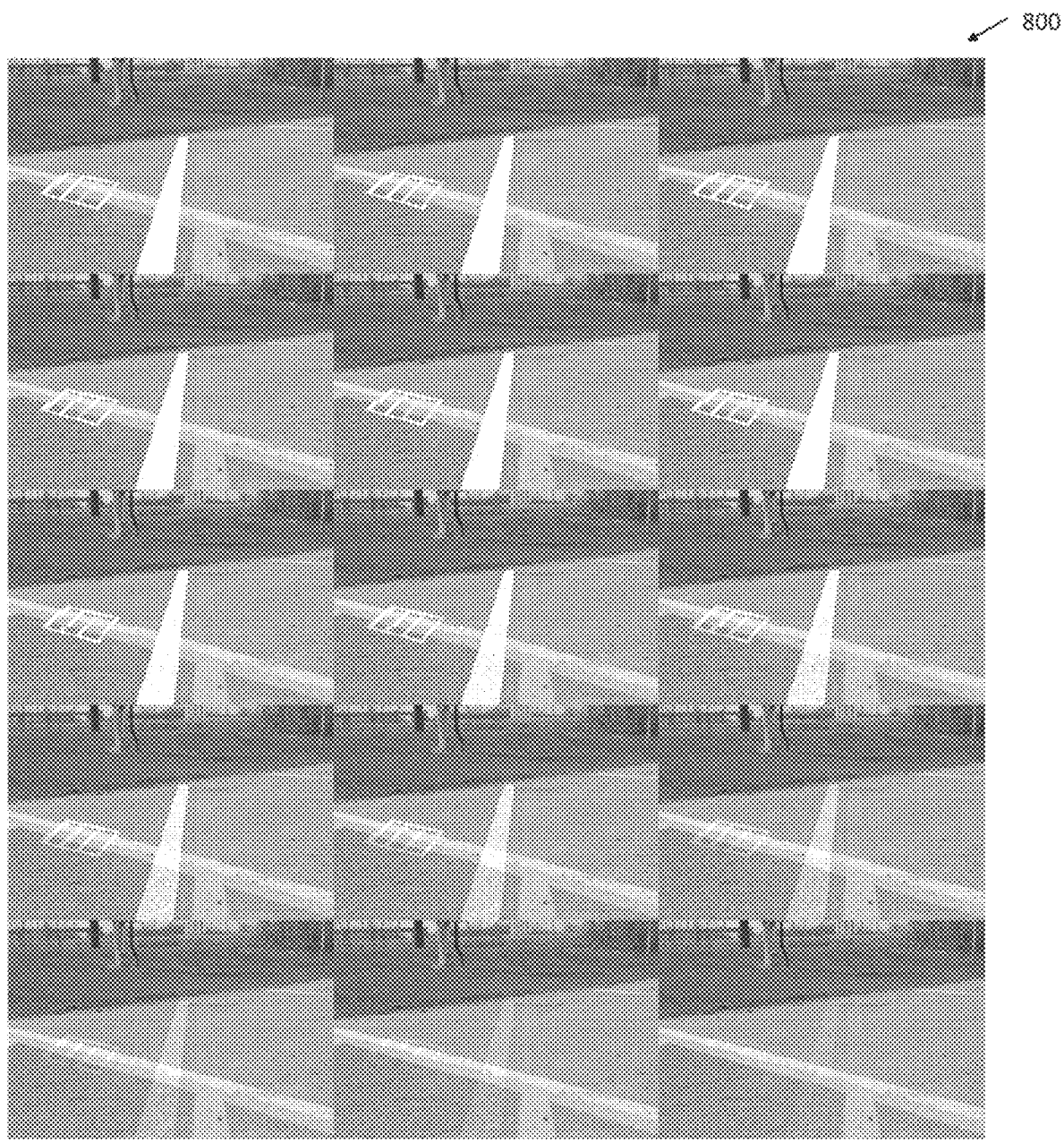
FIG. 8 is a series of augmented images showing representations (e.g., virtual paint markings) of subsurface features (e.g., utility pipes) with increasing lightness thresholds (from left to right, continuing by rows from top to bottom) according to the "advanced technique"

Likewise the lightness threshold T may be tuned to improve visual appearance of the representations (e.g., virtual paint markings) of subsurface features (e.g., utility pipes). FIG. 8 is a series of augmented images 800 showing representations (e.g., virtual paint markings) of subsurface features (e.g., utility pipes) with increasing lightness thresholds (from left to right, continuing by rows from top to bottom) according to the "advanced technique." By adjusting lightness threshold an improved result may be achieved for various circumstances.

While two specific relations are described above (i.e. the "base technique" and the "advanced technique"), it should be understood that a wide variety of different relations may alternatively be employed to change color, but preserve texture.

Figure 9:
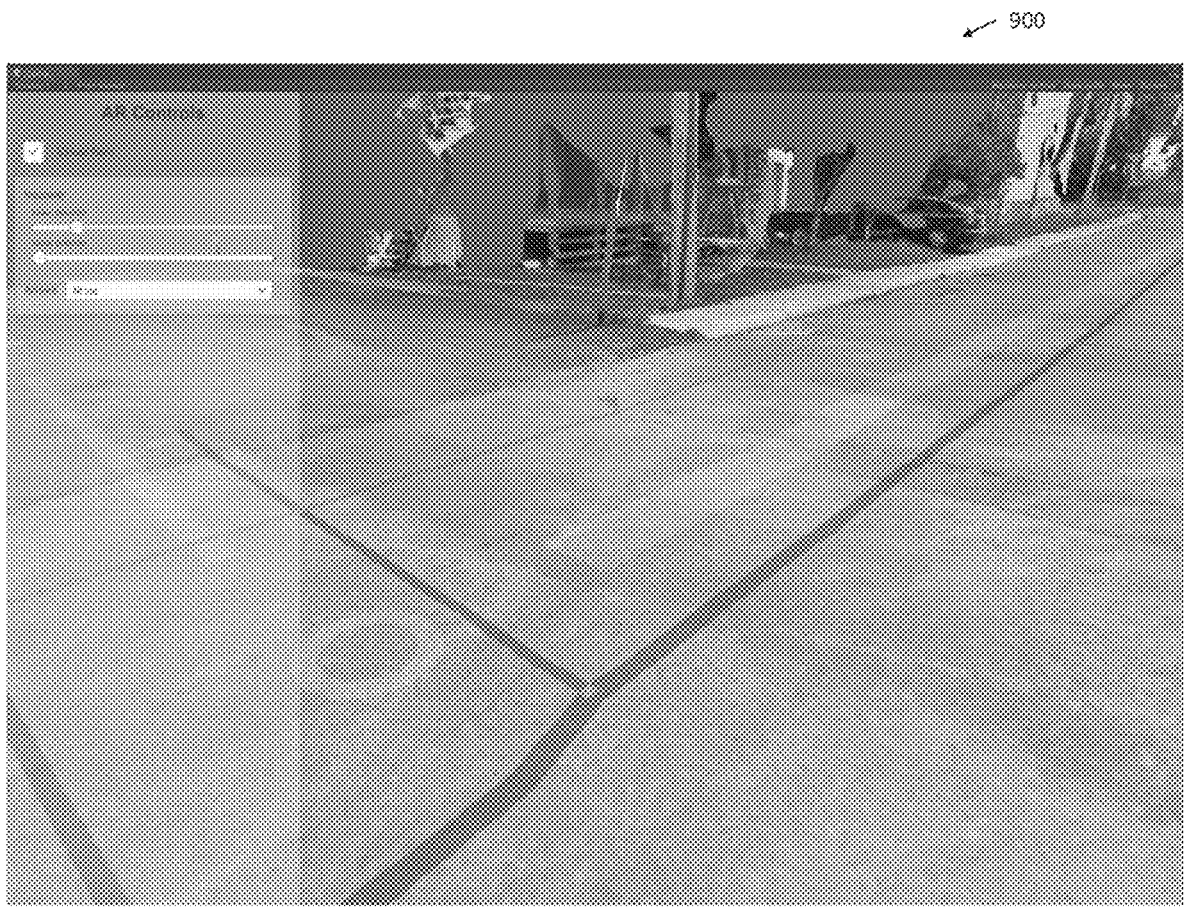
FIG. 9 is an example augmented image that may be displayed in the case of augmentation of a 3D rendering (e.g., a rendering of a 3D reality mesh).

At step 270, the augmented reality application 122 displays the augmented image to a user on a display device 160. Such display may include a conversion to a different color space (e.g., the RGB) color space, which is supported by the display device 160. As discussed above, the display device may take a number of different forms, depending on whether the techniques are being used as part of live augmentation, or augmentation of stored images or 3D renderings (e.g., renderings of a 3D reality mesh). FIG. 9 is an example augmented image 900 that may be displayed in the case of augmentation of a 3D rendering. The representations (e.g., virtual paint markings) of subsurface features (e.g., utility pipes) have characteristics similar to physical markings (e.g., actual spray paint), and neither appear to "float above" the terrain surface, nor occlude the terrain surface completely. While the augmented image 900 is shown here in greyscale for patent reproduction purposes, it should be understood that the image is typically in color.

While the above description discusses an example for improving perception of representations of subsurface features on a terrain surface, it should be understood that a number of modifications and/or additions may be made without departing from the intended spirit and scope of the disclosure. In addition to subsurface features and a terrain surface, it should be understood that the techniques may be used with a variety of other types of hidden features, imposed on a variety of other types of surfaces. For example, in an alternative implementation, the techniques may be used with electrical wiring, pipes, structural members, or other hidden features in a wall or ceiling. Rather than the terrain/ground, the surface may be the wall surface or ceiling surface. A model of the hidden features (e.g., a wiring model, pipe model, structural model, etc.) may be used in place of the above described model of the subsurface features 126, and a model of the surface (e.g., a model including the wall, ceiling, etc.) may be used in place of the above described model of the terrain surface 128. The model of the hidden features may be projected onto the model of the surface. One of skill in the art would readily understand how to adapt the techniques discussed above to this alternative implementation, to improve perception of representations of these hidden features on surfaces other than terrain/ground. Such an alternative implementation may have a variety of practical applications in the field of building information modeling (BIM) to assist with renovation, demolition, and maintenance tasks, among other uses.

Further, while examples are provided above involving use of one or more uniform colors, it should be understood that alternative embodiments may utilize patterns (e.g., diagonal lines, arrows, crosshatch, etc.), contours (e.g., border effects or "highlighting" effects), or other combinations of one or more colors for the representations (e.g., virtual paint).

Finally, it should be understood that many of the above discussed techniques may be implemented in software, in hardware, or in a combination thereof. A software implementation may include electronic device-executable instructions stored in a non-transitory electronic device-readable medium, such as a volatile or persistent memory, a hard-disk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components. Above all, it should be understood that the above descriptions are meant to be taken only by way of example.

What is claimed is:

1. A method comprising:
accessing an input image of a terrain surface in a physical environment;
creating an augmentation stencil image aligned with the input image based on an orthogonal projection of a model of the subsurface features onto a model of the terrain surface, the augmentation stencil image to include pixels set to one or more virtual paint colors that serve as a representation of projected subsurface features, the augmentation stencil image including pixels that each have pixel values in a hue saturation lightness (HSL) color space;
converting the input image to include pixels that each have pixel values in the HSL color space;
creating, by an electronic device, an augmented image that, for each pixel that falls outside of the representation of projected subsurface features, has pixel values based on a hue value, a saturation value and a lightness value of the input image, and for each pixel that coincides with the representation of projected subsurface features, has pixel values based on a hue value and a saturation value of the augmentation stencil image that provide color and a lightness value based on the input image that preserves texture; and
displaying, on a display device, the augmented image to a user.

2. The method of claim 1, wherein the electronic device is an augmented reality device, and the method further comprises:
capturing the input image of the terrain surface by a camera of the augmented reality device, and
wherein the display device is a display device of the augmented reality device.

3. The method of claim 2, wherein the camera that captures the input image has a pose in the physical environment, and the creating the augmentation stencil image comprises:
in a three-dimensional (3D) virtual environment, aligning the model of the subsurface features with the model of the terrain surface;
orthogonally projecting the model of the subsurface feature onto the model of the terrain surface;
positioning a virtual camera in the 3D virtual environment to have a pose in the 3D virtual environment that corresponds to the pose of the camera in the physical environment; and
rendering the augmentation stencil image based on the orthogonal projection of the model of the subsurface features on the model of the terrain surface as viewed from the pose of the virtual camera.

4. The method of claim 1, wherein the creating the augmented image sets each pixel that falls outside of the representation of projected subsurface features to have pixel values equal to the hue value, the saturation value and the lightness value of the input image.

5. The method of claim 1, wherein the creating the augmented image sets each pixel that coincides with the representation of projected subsurface features to have pixel values equal to the hue value and the saturation value of the augmentation stencil image.

6. The method of claim 5, wherein the creating the augmented image sets each pixel that coincides with the representation of projected subsurface features to have pixel values equal to the lightness value of the input image.

7. The method of claim 5, wherein the creating the augmented image sets each pixel that coincides with the representation of projected subsurface features to have pixel values with a lightness value based on the input image according to a first relation for non-white colors and a second, different relation for white.

8. The method of claim 7, wherein the first relation is based on a white threshold and a black threshold, and the second relation is based on a lightness threshold.

9. The method of claim 1, wherein the subsurface features are pipes and the terrain surface is a paved surface.

10. The method of claim 1, wherein the one or more virtual paint colors is a pattern of multiple virtual paint colors.

11. A method comprising:
accessing an input image of a surface in a physical environment, the input image including pixels that each have pixel values in a color space;
creating an augmentation stencil image aligned with the input image, the augmentation stencil image to include pixels set to one or more virtual paint colors that serve as a representation of hidden features, the augmentation stencil image including pixels that each have pixel values in the color space;
creating, by an electronic device, an augmented image that, for each pixel that falls outside of the representation of hidden features, has pixel values based on the pixel values of the input image, and for each pixel that coincides with the representation of hidden features, has at least one pixel value based on the pixel values of the augmentation stencil image that provides color and at least one pixel value based on the pixel values of the input image that preserves texture; and
displaying, on a display device, the augmented image to a user.

12. The method of claim 11, wherein the electronic device is an augmented reality device, and the method further comprises:
capturing the input image of the surface by a camera of the augmented reality device, and
wherein the display device is a display device of the augmented reality device.

13. The method of claim 12, wherein the camera that captures the input image has a pose in the physical environment, and the creating the augmentation stencil image comprises:
in a three-dimensional (3D) virtual environment, aligning a model of the hidden features with a model of the surface;
projecting the model of the hidden features onto the model of the surface;
positioning a virtual camera in the 3D virtual environment to have a pose in the 3D virtual environment that corresponds to the pose of the camera in the physical environment; and
rendering the augmentation stencil image based on the projection of the model of the hidden features on the model of the surface as viewed from the pose of the virtual camera.

14. The method of claim 11, wherein the color space is a hue saturation lightness (HSL) color space.

15. The method of claim 14, wherein the creating the augmented image sets each pixel that falls outside of the representation of hidden features to have pixel values based on a hue value, a saturation value and a lightness value of the input image, and for each pixel that coincides with the representation of hidden features to have pixel values based on a hue value and a saturation value of the augmentation stencil image that provide color and a lightness value based on the input image that preserves texture.

16. The method of claim 11, wherein the color space in a hue saturation value (HSV) color space.

17. The method of claim 11, wherein hidden features are pipes and the surface is a paved surface.

18. An augmented reality device comprising:
a camera configured to capture an input image of a terrain surface in a physical environment;
a display device configured to display an augmented image to a user;
a processor; and
a memory coupled to the processor and configured to store instructions for an augmented reality application that are executable on the processor, the instructions for the augmented reality application, when executed, operable to:
access an augmentation stencil image aligned with the input image, the augmentation stencil image to include pixels set to one or more virtual paint colors that serve as a representation of subsurface features, and
create the augmented image by setting each pixel that falls outside of the representation of subsurface features to have pixel values equal to the input image, and setting each pixel that coincides with the representation of subsurface features to have at least one pixel value equal to the augmentation stencil image, and setting each pixel that coincides with the representation of subsurface features to have at least one pixel value equal to the input image.

19. The augmented reality device of claim 18 wherein the augmented reality application when executed, is further operable to create the augmentation stencil image, wherein operations to create the augmentation stencil image comprise aligning a model of the subsurface features with a model of the terrain surface in a three-dimensional (3D) virtual environment, orthogonally projecting the model of the subsurface features onto the model of the terrain surface, positioning a virtual camera in the 3D virtual environment to have a pose in the 3D virtual environment that corresponds to the pose of the camera in the physical environment, and rendering the augmentation stencil image based on the orthogonal projection of the model of the subsurface features on the model of subsurface features as viewed from the pose of the virtual camera.

\* \* \* \* \*

UNITED STATES PATENT AND TRADEMARK OFFICE
CERTIFICATE OF CORRECTION

| | |
|---|---|
| PATENT NO. | : 10,930,078 B1 |
| APPLICATION NO. | : 16/178360 |
| DATED | : February 23, 2021 |
| INVENTOR(S) | : Stéphane Côté et al. |

Page 1 of 1

It is certified that error appears in the above-identified patent and that said Letters Patent is hereby corrected as shown below:

On the Title Page

(63) should read:
(60) Provisional application No. 62/580,369, filed on Nov. 1, 2017.

In the Specification

Column 4, Line 19:
Should read:
coupled to volatile and non-volatile memory/storage devices In the Claims Column 10, Lines 56-57:
Claim 3:
Should read:
orthogonally projecting the model of the subsurface features onto the model of the terrain surface;

Signed and Sealed this
Twentieth Day of April, 2021

Drew Hirshfeld
*Performing the Functions and Duties of the
Under Secretary of Commerce for Intellectual Property and
Director of the United States Patent and Trademark Office*